(12) United States Patent
Imai (10) Patent No.: US 7,064,874 B2
(45) Date of Patent: Jun. 20, 2006

(54) BOTH-SIDE DOCUMENT READING APPARATUS AND BOTH-SIDE DOCUMENT READING METHOD

(75) Inventor: Takashi Imai, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 878 days.

(21) Appl. No.: 10/000,572

(22) Filed: Oct. 23, 2001

(65) Prior Publication Data

US 2002/0048053 A1    Apr. 25, 2002

(30) Foreign Application Priority Data

Oct. 25, 2000    (JP) .......................... P2000-325748

(51) Int. Cl.
*H04N 1/04* (2006.01)
*H04N 1/40* (2006.01)

(52) U.S. Cl. ...................... 358/498; 358/448; 358/447; 358/497; 358/475

(58) Field of Classification Search ................ 358/498, 358/448, 447, 497, 475
See application file for complete search history.

(56) References Cited

U.S. PATENT DOCUMENTS

| 4,956,547 | A | | 9/1990 | Mita |
| 5,859,726 | A | | 1/1999 | Copenhaver et al. |
| 5,864,408 | A | | 1/1999 | Kumashiro ................. 358/461 |
| 6,122,077 | A | * | 9/2000 | Kaji ............................ 358/448 |
| 6,323,933 | B1 | * | 11/2001 | Anzai .......................... 355/23 |
| 2002/0039207 | A1 | * | 4/2002 | Kanda ........................ 358/498 |

FOREIGN PATENT DOCUMENTS

| JP | 3-240361 | 10/1991 |
| JP | 04-266261 | 9/1992 |
| JP | 7-327111 | 12/1995 |
| JP | 08-195859 | 7/1996 |
| JP | 9-46484 | 2/1997 |
| JP | 09-074465 | 3/1997 |
| JP | 09-321947 | 12/1997 |
| JP | 10-098588 | 4/1998 |
| JP | 11-069086 | 3/1999 |
| JP | 11-127350 | 5/1999 |
| JP | 11-136448 | 5/1999 |
| JP | 2000-188668 | 7/2000 |
| JP | 2002-111974 | 4/2002 |

OTHER PUBLICATIONS 2000-325748; Notification for Reason of Refusal dated May 25, 2004.
2000-325748; Notification for Reason of Refusal dated Feb. 17, 2004.
Partial European Search Report for Application No. EP 01 30 9016 dated Jan. 3, 2002.

* cited by examiner

*Primary Examiner*—Thomas D. Lee
*Assistant Examiner*—Houshang Safaipour
(74) *Attorney, Agent, or Firm*—Renner, Otto, Boisselle and Sklar, LLP (57) ABSTRACT

First and second scanning and reading systems are arranged on the both sides of the document transport path. The image reading region by the first scanning and reading system is positioned on an upstream side of an image reading region by the second scanning and reading system. The document images on the surfaces are read while illuminating with light from light sources of the scanning and reading systems the main and back surfaces of the document being transported on the document transport path. Until the document image reading by the second scanning and reading system is ended, the light amount of the light source of the first scanning and reading system is maintained constant thereby preventing the reception-light amount in the second scanning and reading system from changing.

18 Claims, 6 Drawing Sheets

BOTH-SIDE DOCUMENT READING APPARATUS AND BOTH-SIDE DOCUMENT READING METHOD

BACKGROUND OF THE INVENTION

1. Field of the Invention

The present invention relates to a both-side document reading apparatus used, for example, in a scanner apparatus, copier, printer, facsimile or the like, and a both-side document reading method to be implemented in the apparatus. More particularly, the invention relates to a countermeasure for properly obtaining read data of density.

2. Description of the Related Art

Conventionally, there is known both-side document reading apparatus having a function to read images and characters on the both surfaces of a document by the reading means arranged on the both sides of a document transport path disclosed in Japanese Unexamined Patent Publications JP-A 9-321947 (1997) and JP-A 10-98588 (1998), for example.

Specifically, JP-A 9-321947 discloses a technical idea having reading means having light sources arranged on the main and back sides of a reading document to illuminate the surfaces of the document with light, so that the light source on the main-surface side and the light source on the back-surface side are alternately switch-controlled on a scanning-line basis and the reading at the document main and back surfaces is alternately switched interactively with putting on and off of the light sources, thereby avoiding optical interference. Namely, back reflection is avoided from occurring on the document read data of the other reading means due to the light source of one reading means.

On the other hand, JP-A 10-98588 discloses a technical idea that the reading means are deviated in positions not opposed to each other in order to prevent interference between the illumination from a light source of the reading means for reading a document main surface and the illumination from a light source of the reading means for reading a document back surface, thereby avoiding optical interference.

In the meanwhile, the technology described in JP-A 9-321947 must have an extremely high responsibility in putting on and off the light sources because both the light sources are controlled in putting on and off in order to put one only of both the light sources on a scanning-line basis. As a result, there has been the restriction of incapability of using a low responsible light source. Also, where increasing the document transport rate in order to increase the number of reading documents per unit time, there is a need for light sources having further higher responsibility thus incurring cost mounting-up. Furthermore, because there is a limitation in light-source responsibility, the document reading rate suffers the restriction to light-source responsibility thus imposing a limitation in increasing the document reading rate.

The technology of JP-A 10-98588 displaces in position the document reading means arranged on the both sides of the document transport path in a document transport direction thereby making possible to avoid the problem in the JP-A 9-321947. In the meanwhile, in the technology described in JP-A 10-98588, when the reading at document one surface is completed, the light source of the document reading means having read precedent one surface is put off so that, after completing the reading at the other surface with corresponding delay to the displacement, the light source of the document reading means having read at the other surface is put off. In the case that both of the document reading means are closely provided in order to reduce the apparatus size (where decreasing the displacement), there is a possibility that the light of the light source of the one document reading means be incident on the other document reading means. In this case, despite the reading at the other surface is not completed, the light source on the side reading has precedently completed is put off. Thus, the data of density in reading at the other suffers the effect of the change in light amount. Namely, read data of density changes at the point of light-amount displacement as a boundary, causing a problem of incapability of obtaining correct document reading data.

SUMMARY OF THE INVENTION

The present invention has been made in view of the foregoing point, and it is an object to obtain read data of density of a document under constant reading conditions throughout reading the document with a both-side document reading apparatus having document reading means arranged on both sides of a document transport path to read images at the both sides of the document at once.

In order to achieve the above object, the invention makes invariable the amount of the illumination light to the surfaces of a document until reading operation at both the main and back surfaces of the document has been completely ended thereby preventing reading of density from being affected.

The present invention provides a both-side document reading apparatus comprising document reading means provided on document main-surface and back-surface sides of a document transport path, the document reading means each having a light source for emitting light toward a predetermined region of the document transport path, so that the document reading means read images at main and back surfaces while the light sources illuminate the main and back surfaces of a document moving on the document transport path with light, and maintaining means for maintaining a lighting state of both the light sources while the document exists in at least one illuminating region of the illuminating regions.

According to the invention, light is emitted from the light sources to the main and back surfaces of a document moving on the document transport path. By reading the reflection light of same for example, the document reading means respectively read the images on the main and back surfaces of the document. Where the illuminating regions of light from the light sources are not opposed to each other sandwiching the document transport path (where the illuminating regions of light from the light sources are deviated in the document transport direction), one light source emitting light to a precedent (upstream with respect to the document transport direction) illuminating region terminates an illumination request for the document earlier than the light illumination by the other light source (light source emitting light to a downstream illumination region with respect to the document transport direction). In this case, the invention maintains a lighting state of the one light source having precedently emitted until the light illumination to the document by the other light source ends. Due to this, there is no occurrence of reception-light-amount change in the document reading means reading the image due to the illumination from the other light source, thus avoiding reading of density from being affected.

In the invention it is preferable that the both-side document reading apparatus further comprises position detecting means for detecting a moving position of the document on the document transport path, and lighting means for receiving an output of the position detecting means and deriving a time for the document to reach the illuminating region from a distance of from the detected document moving position to the illuminating region and a document moving velocity, to set a timing of putting on the light source based on the time derived.

According to the invention, it is possible to make coincident the timing of putting on the light source with a time point the document has reached the illuminating region or the timing the light amount of the light source reaches a predetermined light amount with a time point the document has reached the illuminating region. Accordingly, it is possible to avoid the light source from being put on in unnecessarily early timing and hence to reduce power consumption.

In the invention, it is preferable that on-off operations of both the light sources are nearly simultaneously carried out.

The invention provides a both-side document reading apparatus comprising a first light source for illuminating a first surface of a document with light to read an image on the first surface of the document; a second light source for illuminating a second surface of the document with light to read an image on the second surface of the document; and maintaining means for maintaining a lighting state of both the light sources during reading of an image on at least one surface of the surfaces of the document.

In the invention, it is preferable that light from the first light source is emitted to a first illuminating region to read the first surface of the document and light from the second light source is emitted to a second illuminating region to read the second surface of the document, which first illuminating region and second illuminating region are arranged with deviation, and wherein the maintaining means maintains a lighting state of both the light sources during existence of a document between the first illuminating region and the second illuminating region.

In the invention, it is preferable that light from the first light source is emitted to a first illuminating region to read the first surface of the document and light from the second light source is emitted to a second illuminating region to read the second surface of the document, and wherein both the light sources are put on upon reaching or before reaching of the document to at least any one of the first illuminating region and the second illuminating region.

In the invention, it is preferable that light from the first light source is emitted to a first illuminating region to read the first surface of the document and light from the second light surface is emitted to second illuminating region to read the second surface of the document so that document reading is made with delay from reading of the first illuminating region, and wherein the second light source is put on upon reaching or before reaching of the document to the first illuminating region.

In the invention, it is preferable that light from the first light source is emitted to a first illuminating region to read the first surface of the document and light from the second light source is emitted to a second illuminating region to read the second surface of the document, and wherein both the light sources are put off after the document has passed the first illuminating region and the second illuminating region.

In the invention, it is preferable that light from the first light source is emitted to a first illuminating region to read the first surface of the document and light from the second light surface is emitted to second illuminating region to read the second surface of the document so that document reading is made with delay from reading of the first illuminating region, and wherein the first light source is put off after the document has passed the second illuminating region.

The present invention provides a document reading apparatus comprising:

a light source for illuminating a predetermined illuminating region with light in order to read a predetermined surface of a document;

position detecting means for detecting a relative distance between the document and the light source; and lighting means for receiving an output of the position detecting means and deriving a time for the document to reach the illuminating region from a relative distance between the document and the light source and a relative velocity of the document and the light source, to set a timing of putting on the light source based on the time derived.

The present invention provides a both-side document reading method comprising the steps of:

disposing document reading means on document main-surface and back-surface sides of a document transport path, respectively, the document reading means each having a light source for illuminating with light a predetermined region on the document transport path;

illuminating main and back surfaces of the document which is traveling on the document transport path with light from the light sources; and reading images of the main and back surfaces of the document by the document reading means, wherein both the light sources are maintained in lighting state during existence of the document in at least one illuminating region of the illuminating regions.

The present invention provides a both-side document reading method comprising the steps of:

illuminating a first surface of a document with light from a first light source to read an image on the first surface; and illuminating a second surface of the document with light from a second light source to read an image on the second surface, wherein both the light sources are maintained in lighting state during reading of an image on at least one surface of the surfaces of the document.

As in the above, the invention maintains, for the both-side document reading apparatus for reading document images while illuminating with light from the light sources the main and back surface of a document being transported on the document transport path, a lighting state of the illumination light to the document surfaces until reading operation at both the main and back surfaces of the document has been completely ended. Consequently, even where the illuminating regions of light from the light sources are not opposed to each other sandwiching the document transport path, there is no possibility of changes in reception-light amount and reading conditions during reading operations of document images by the document reading means, making constant reading conditions throughout reading the document. Correct image data is made possible to acquire, thus improving apparatus reliability. Meanwhile, this can reduce the size of the apparatus overall because of capability of nearing in position the light sources without incurring image data deterioration.

In addition, where a time a document reaches the illuminating region is calculated by a distance of from a document moving position to the illuminating region and a document moving velocity to set timing of putting on the light source depending on a calculation result thereof, the timing of putting on the light source or the timing the light amount of the light source reaches a predetermined light amount can be made coincident with a time point the document has reached the illuminating region, thereby obtaining a minimally required light-source lighting time and hence reducing the running cost due to power-consumption reduction.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to the drawings, preferred embodiments of the invention are described below.

The present embodiment explains the case the present invention is applied as a scanner apparatus.

Figure 1:
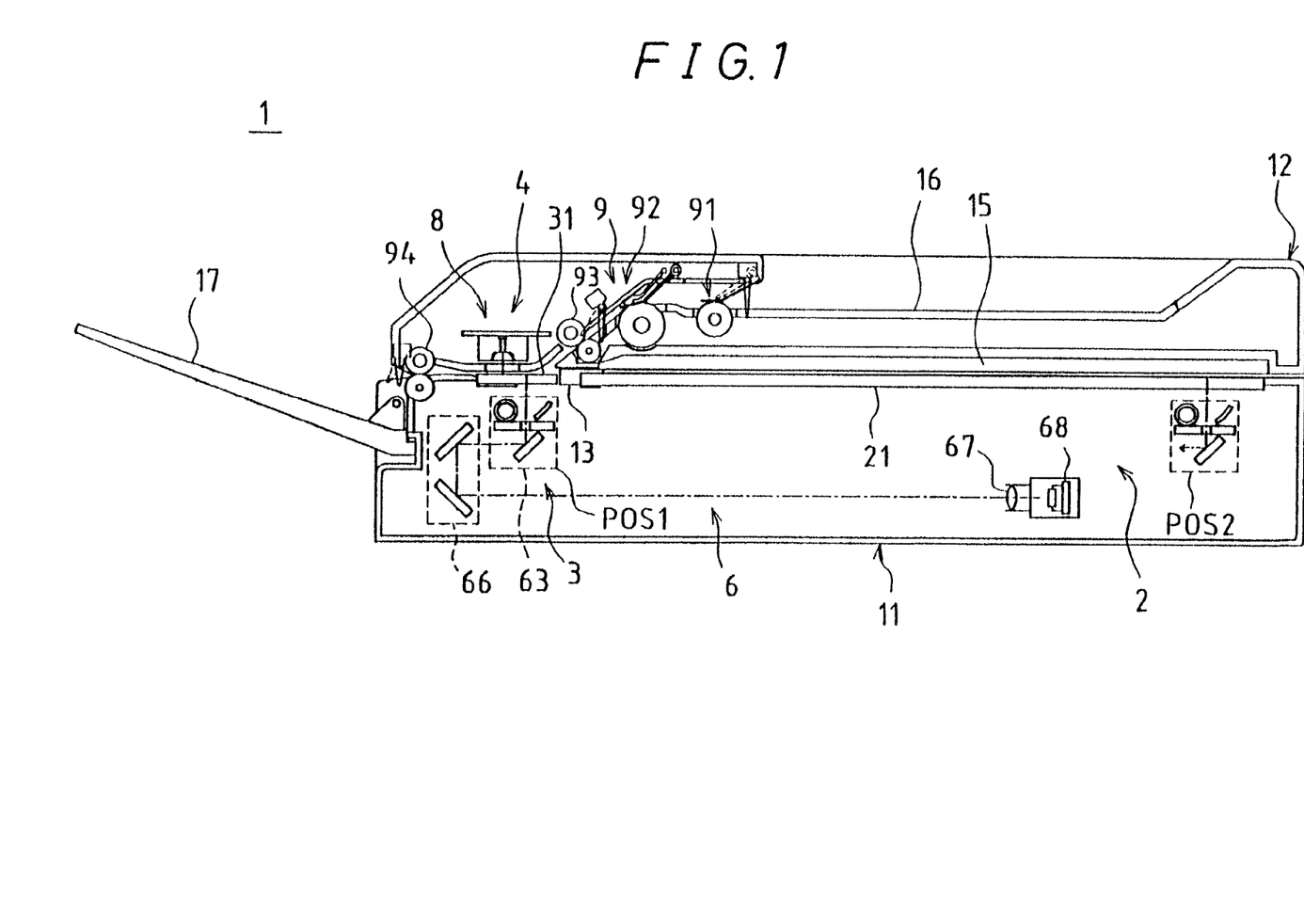
FIG. 1 is a schematic view showing an internal structure of a scanner apparatus according to an embodiment.
Figure 2:
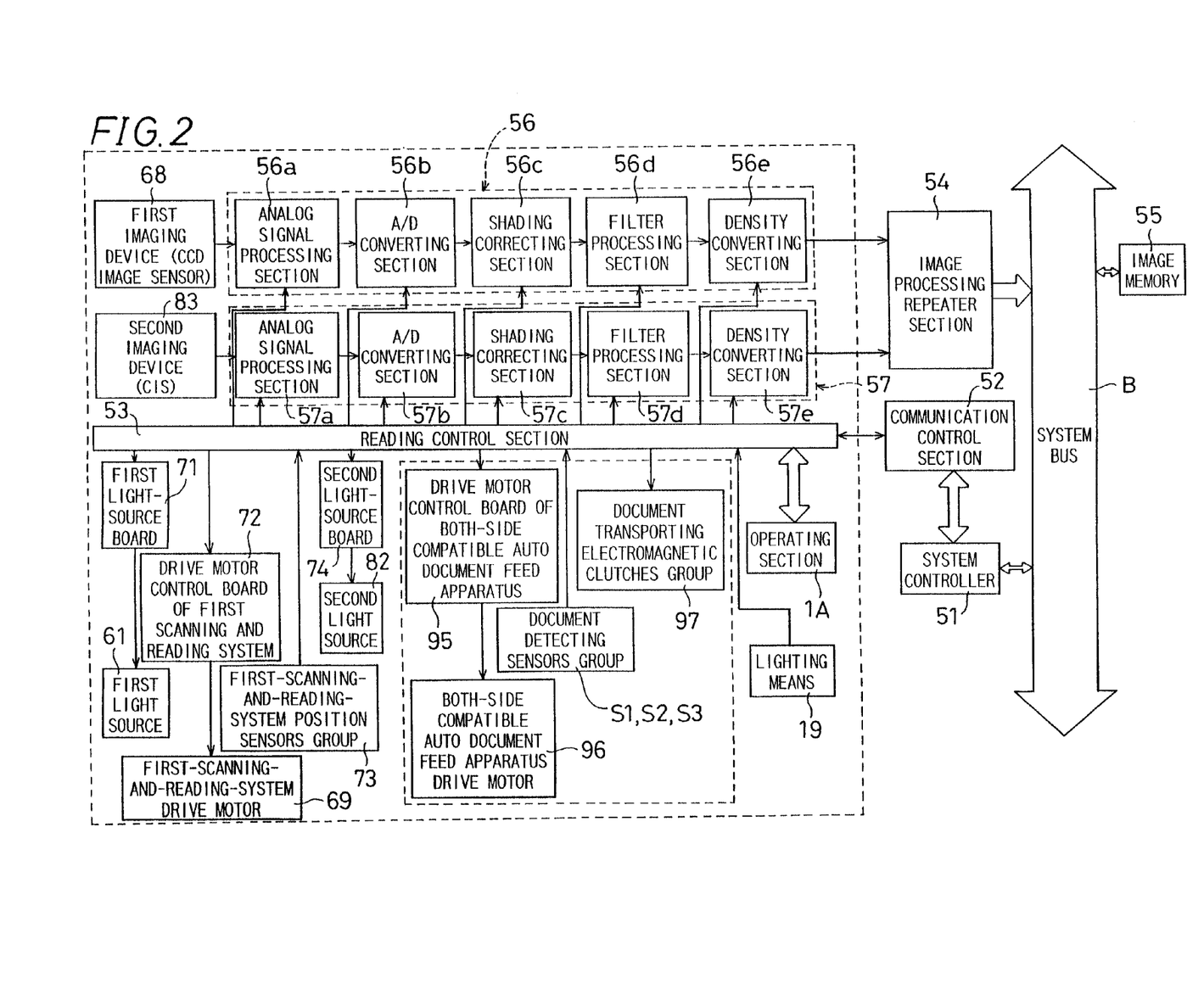
FIG. 2 is a control block diagram of the canner apparatus.

First, a general structure of a scanner apparatus 1 will be explained using FIG. 1 and FIG. 2. FIG. 1 is a schematic view showing an interior structure of a scanner apparatus 1 according to the present embodiment. FIG. 2 is a control block diagram of the scanner apparatus 1.

As shown in FIG. 1, the scanner apparatus 1 has a stationary document reading section 2, a first moving document reading section 3 and a second moving document reading section 4. The stationary document reading section 2 includes a reading region to read an image of a document not to be automatically fed (stationary document), such as a block document or pasted document, manually placed on a first contact glass 21 made of transparent glass by a user. Also, the first moving document reading section 3 and the second moving-document reading section 4 include reading regions to read an image of a moving document automatically fed to a second contact glass 31 made of transparent glass. The first moving document reading section 3 reads an image at a main surface (downward surface in FIG. 1) of a document while the second moving document reading section 4 reads an image at a back surface of the document (upward surface in FIG. 1). The respective ones of document image data read by these reading sections 2, 3, 4 are fed to the first image processing section 56 and the second image processing section 57 (see FIG. 2) where they are subjected to various processes and then stored to an image memory 55 through an image process repeater section 54. The transmitting and receiving operations of image data will be explained later.

Now, the structure of the scanner apparatus 1 will be explained in detail using FIG. 1 to FIG. 3. Note that FIG. 3 is a sectional view showing an essential part of the scanner apparatus 1.

Figure 3:
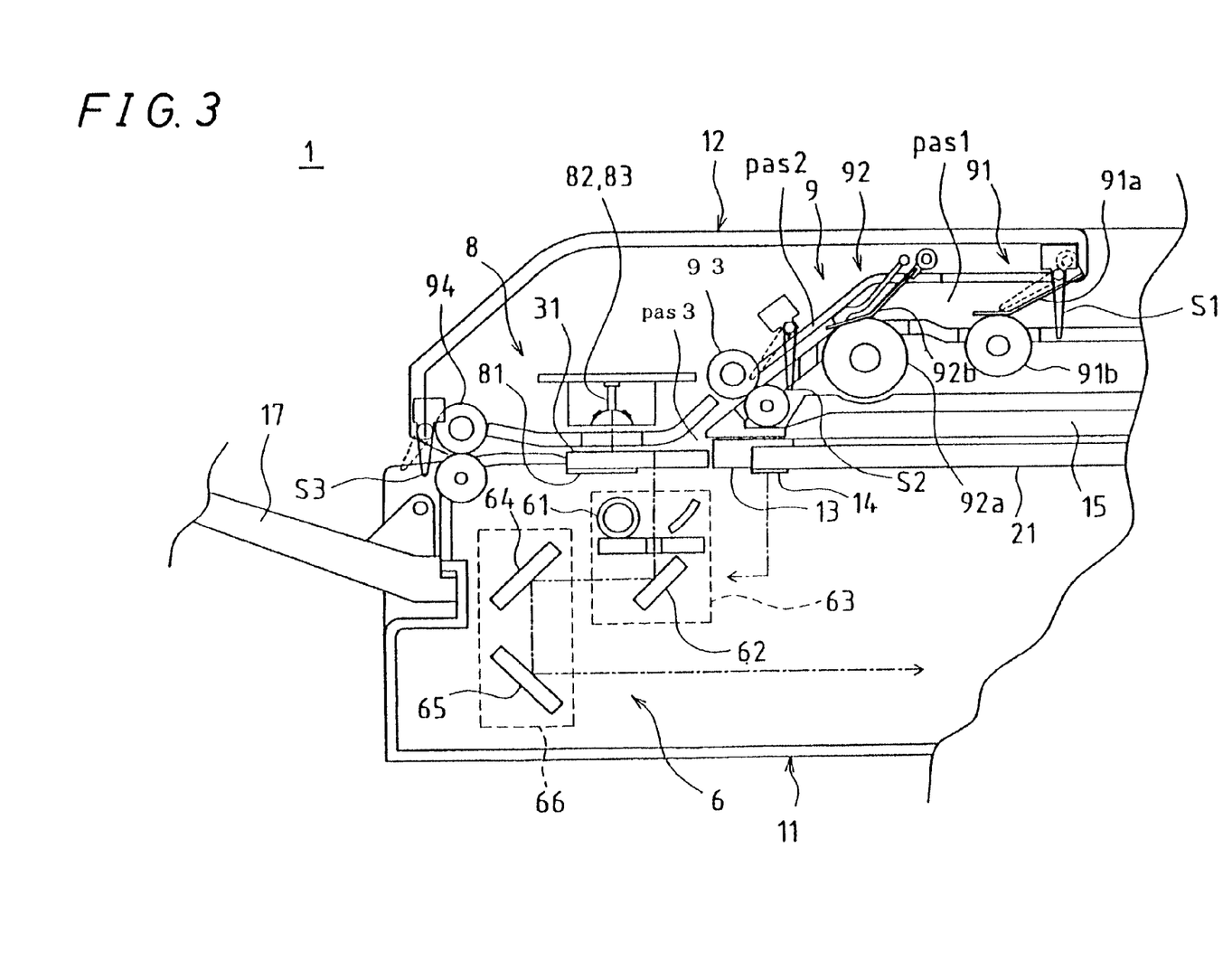
FIG. 3 is a sectional view showing an essential part of the scanner apparatus.

As shown in FIG. 1 to FIG. 3, the scanner apparatus 1 is structured with a main body part 11 and an opening part 12, to enable document-reading operation in two modes of a one-side reading mode and a both-side reading mode. The main body part 11 has, on its upper surface, a first contact glass 21, a document reference plate 13 and a second contact glass 31 arranged in the order from the right in FIG. 1 and FIG. 3.

The document reference plate 13 is printed with a not-shown index indicating document sizes and placing orientations so that a document can be easily rested in the stationary document reading section on the first contact glass 21. Also, on the side of the document reference plate 13 opposite to the first contact glass 21, there is provided a first reference white plate 14 to be used in implementing shading (white-level determination) of a first photoelectric converting element 68 of a first scanning and reading system 6 hereinafter referred.

Within the main body part 11 is arranged a first scanning and reading system 6 having a first scanning unit 63 integrally supporting a first light source 61 for illuminating a document with light and a first mirror 62, a second scanning unit 66 integrally supporting a second mirror 64 and a third mirror 65, a first focusing lens 67 and a first solid imaging device (CCD image sensor) 68. The first scanning unit 63 and the second scanning unit 66 are wound around with a not-shown wire, to be driven by a driving motor 69 of the first scanning and reading system, which is a stepping motor (see FIG. 2). The scanning unit 63, 66 moves rightward in FIG. 1 when the first-scanning-and-reading-system driving motor 69 rotates forward, and moves leftward in FIG. 1 when the first-read-scanning-system driving motor 69 rotates reverse. Specifically, the second scanning unit 66 is arranged to move at a half speed with respect to the first scanning unit 63 in the same direction as the first scanning unit 63.

The first scanning and reading system 6 as document reading means is used in both stationary-document reading and moving-document reading. During stationary-document reading, the first scanning unit 63 of the first scanning and reading system 6 moves from a position pos1 to a position pos2 in FIG. 1, to read-scan a stationary document on the first contact glass 21. During reading a moving document, the first scanning unit 63 of the first scanning and reading system 6 is in stoppage in the position pos1 in FIG. 1.

The first scanning unit 63, during scanning and reading, illuminates the document (toward a illumination area as referred in the invention) with light from the first light source 61 and reflects the reflection light from the document through the first mirror 62 to the second mirror 64 of the second scanning unit 66. The second scanning unit 66 reflects the reflection light from the first mirror 62 through the second mirror 64 and third mirror 65 to the first focusing lens 67. The first focusing lens 67 focuses the reflection light from the third mirror 65 onto a light receiving surface of the first imaging device 68. The first imaging device 68 performs conversion into an electric image signal depending on a reception-light intensity and outputs it.

Meanwhile, as shown in FIG. 2, the scanner apparatus 1 has, in its control system, a system controller 51, a communication control section 52, a reading control section 53 for receiving signals from an operating section 1A of the apparatus 1, the image processing repeater section 54, an image memory 55, a first image processing section 56 and a second image processing section 57.

The system controller 51 controls the reading control section 53 through the communication control section 52, and further controls the image process repeater section 54 and image memory 55 through a system bus B, thereby controlling the image reading system overall in order for properly carrying out a series of document reading operations.

Meanwhile, as shown in FIG. 2, the first light-source board 71 puts on and off the first light source 61 of the first scanning and reading system 6 depending on a signal of the reading control section 53.

A first-reading-and-scanning-system drive motor control board 72 controls the first-reading-and-scanning-system drive motor 69 depending on a signal of the reading control section 53, to move the first scanning unit 63 and second scanning unit 66 rightward and leftward in FIG. 1.

A first-reading-and-scanning-system position sensor group 73 is arranged in a position of opposing a first scanning unit 63 to the first moving document reading section 3 and in the vicinity of capable of reading a first reference white plate 14, to output a reference position signal to the reading control section 53 when the first scanning unit 63 comes to this position.

The reading control section 53 calculates a position of the first scanning unit 63 on the basis of a reference position signal of the first-reading-and-scanning-system position sensor group 73 and a step count of the first-reading-and-scanning-system drive motor 69, to control the forward and reverse rotation of the first-reading-and-scanning-system drive motor 69 thereby reciprocally moving the first scanning unit 63 and the second scanning unit 66.

Then, as shown in FIG. 1, the opening part 12 of the scanner apparatus 1 is structured to rotate upward about, as a rotation fulcrum, a hinge (not shown) provided deep in the scanner apparatus 1 (right side in FIG. 1) cooperatively with the main body part 11, thus allowing the scanner apparatus 1 to open at the front (left side in FIG. 1). In the underside of the opening part 12 of the scanner apparatus 1, an OC mat 15 is formed white in a surface close to the first contact glass 21 such that it can be contacted with the first contact glass 21 during closure of the opening part 12. In the structure, a sheet document rested on the stationary document reading section 2 is pressed in close contact with the first contact glass 21 by the OC mat 15.

As shown in FIG. 1 and FIG. 3, within the opening part 12, an automatic document feeding device 9 is arranged to feed a document from a document set tray 16 for setting documents to the first moving document reading section 3 and second moving document reading section 4, and eject the document to an eject tray 17. Also, in the opening part 12 in its leftward region, a second scanning and reading system 8 as document reading means is provided to read-scan a document moving through the second moving document reading section 4.

As shown in FIG. 3, the automatic document feed device 9 has a transport path pas1 between a paper feed section 91 and separation transport means 92, a transport path pas2 between the separation feed means 92 and an aligning roller pair 93, and a document reading transport path pas3 provided between the aligning roller pair 93 and an eject roller pair 94 to have the first moving document reading section 3 and the second moving document reading section 4. These transport paths pas1–pas3 constitute a document transport path. Now, explanation will be made on the structure and operation of the parts of the automatic document feed device 9.

The paper feed section 91 is structured with a document hold 91a and a paper feed roller 91b, to transport a document set on a document set tray 16 to separation feed means 92.

The separation feed means 92 is structured with a separation feed roller 92a and a separation pad 92b, so that the documents fed from the paper feed section 91 are introduced to the separation feed means 92 where they are separated sheet by sheet and transported toward the aligning roller pair 93. Also, the separation feed means 92 has an electromagnetic clutch (not shown) on a drive shaft of the separation feed roller 92a, to switch over between connection and non-connection for a drive system that transmits a drive force from a drive motor (not shown) of the automatic document feed device 9.

The aligning roller pair 93 has an electromagnetic clutch (not shown) on its drive shaft, to switch over between connection and non-connection for a drive system that transmits a drive force from a drive motor of the automatic document feed device 9. The aligning roller pair 93 is arranged to halt before a document detecting sensor s2 is contacted by a tip of a document fed by the separation feed means 92 to output a signal to the reading control section 53 and start transportation toward the downstream after outputting a signal to the reading control section 53.

The second contact glass 31 cooperates with the aligning roller pair 93 to form a document-reading transport path pas3. A second moving document reading section 4 is arranged in a position opposed to a second reference white plate 81 arranged in the underside of the second contact glass 31.

The eject roller pair 94 is integrally and rotatably provided to an opening part a side surface of the scanner apparatus 1, to eject the document passed the scanner reading transport path pas3 to the eject tray 17.

Document detecting sensors s1, s2, s3 as position detecting means are respectively arranged in positions of immediately in front of the paper feed section 91 with respect to a feed direction, immediately in front of the aligning roller pair 93 with respect to the feed direction and immediately downstream the eject roller pair 94 with respect to the feed direction. As shown in FIG. 2, the document detecting sensor group s1, s2, s3 is used to notify a document position to the reading control section 53 and control document transport or light-source putting on and off.

Next, the operation of the parts of the automatic document feed device 9 will be explained using a block diagram of FIG. 2.

As shown in FIG. 2, a drive motor control board 95 of the automatic document feed device 9 is structured to on/off-control a drive motor 96 as a stepping motor in accordance with the signal from the reading control section 53 and drive a driving system for the automatic document feed device 9, thereby conveying a drive force to the paper feed roller 91b, separation feed means 92, aligning roller pair 93, eject roller pair 94 and other feed rollers. Also, the drive motor 96 is to be varied in rotation velocity by a pulse rate from the drive motor control board 95.

The document detecting sensor group s1, s2, s3 conveys a detection signal of a document to the reading control section 53 when the document reaches a position of the sensor. On the contrary, the reading control section 53 calculates whether the document is being fed in proper timing, on the basis of a detection signal of a document from the document detecting sensor group s1, s2, s3 and a timer. In the case of poor feeding, an occurrence signal such as of jam is conveyed to the system controller 51 through a system bus B.

An electromagnetic clutch group 97 turns on and off due to a signal from the reading control section 53, to switch over to connection or non-connection for the respective drive systems of the automatic document feed device 9 thereby causing-the drive systems to stop or rotate.

Next, the second scanning and reading system 8 will be explained. As shown in FIG. 3, the second scanning and reading system 8, arranged within the opening part 12 of the scanner apparatus 1, is a scanning and reading system to read, in a moving state, a document moving through the second moving document reading section 4. The second scanning and reading system 8 is structured by a second light source (LED) 82 for illuminating an upper surface of a document moving through the second moving document reading section 4, a second imaging device (Contact Image Sensor: CIS) 83 for conversion into an electric image signal and outputting depending on an intensity of reception light, and a second reference white plate 81 for reading-in as a white-area level when performing shading on an electric image signal outputted from the second imaging device 83 (determining a white-area level). Note that the second reference white plate 81 is provided in the main body part 11 of the scanner apparatus 1. Also, the second moving document reading section 4 as a region the second light source 82 illuminates a document with light is set up downstream the first moving document reading section 3 with respect to a document transport direction as a region the first light source 61 illuminates a document with light. By deviating the regions of light emitted from the light sources 61, 82 in the document transport direction in this manner, so-called back reflection can be prevented that the image data of a not-opposed surface enters as document image data acquired in each scanning and reading system 6, 8.

Also, as shown in FIG. 2, the second light source board 74 puts on and off the second light source 82 of the second scanning and reading system 8 on the basis of a signal of the reading control section 53.

The reading control section 53, in the both-side reading mode, performs shading on the electric image signal outputted from the second imaging device 83.

Next, explanation will be made on the processing of the electric image signal obtained by scanning and reading in the one-side reading mode and both-side read mode, using FIG. 1 to FIG. 3.

As shown in FIG. 2, the electric image signals, obtained in read-scanning by the first imaging device 68 of the first scanning and reading system 6 and the second imaging device 83 of the second scanning and reading system 8 (hereinafter, referred to as image signals), are sent to the image processing sections 56, 57 where they are subjected to predetermined image processes. Thereafter, they are sent to the image processing repeater section 54 and further subjected to a predetermined process, followed by being stored to the image memory 55 separately on a page-by-page basis through the system bus B. The image processing sections 56, 57 are configured with an analog signal processing section 56a, 57a, an A/D converter 56b, 57b, a shading correcting section 56c, 57c, a filter processing section 56a, 57d, and a density converting section 56e, 57e. The elements of these image processing section 56, 57 operate under the control of the reading control section 53.

The analog signal processing sections 56a, 56b respectively perform level-converting processing, sample-hold processing and signal-amplification processing on the image signal inputted from the first imaging device 68 and the image signal inputted from the second imaging device 83, and output them to the A/D converting sections 56b, 57b. Because the first scanning and reading system 6 and the second scanning and reading system 8 are different in light-source light amount, photoelectric-conversion efficiency, output-signal level, etc., exclusive analog signal processing sections 56a, 57a are respectively provided for the first imaging device and the second imaging device.

The A/D converting sections 56b, 57b digitally convert the analog image signals inputted from the analog signal processing sections 56a, 57a and output quantized image signals to the shading correcting circuits 56c, 57c.

The shading correcting section 56c, 57c performs black reproduction and white reproduction on the quantized image signal inputted from the A/D converting section 56b, 57b and outputs it to the filter processing section 56d, 57d. Note that black reproduction is meant to delete the effect of an implicit output by sampling and storing an implicit output of the first imaging device 68 or second imaging device 83 and subtracting it from an image signal as read data outputted from the first imaging device 68 or second imaging device 83 during document reading. Meanwhile, white reproduction is to normalize the image signal of upon document reading into each pixel depending upon an each-pixel image signal of upon reading a reference white plate 14, 81 even in reflectivity, thereby correcting uneven light quantity, effect on optical parts and pixel sensitivity variation due to the first imaging device 68 or second imaging device 83.

The filter processing section 56d, 57d performs a predetermined filter process, concretely a space filtering process, on an image signal inputted from the shading correcting section 57c, 57c on the basis of a coefficient for determining a set filter characteristic from the reading control section 53, thereby emphasizing a high-frequency component in the image to repair image "blur". Namely, the image signal outputted from the first imaging device 68 and second imaging device 83 contains MTF (Modulation Transfer Function) deterioration resulting from the optical parts such as lenses and mirrors, aperture opening degree in the light-receiving surface of the first imaging device 68 and second imaging device 83, the transfer efficiency and remaining image by the first imaging device 68 and the second imaging device 83, the integration effect and uneven operation due to physical scanning and so on, so that such MTF deterioration is compensated for by the filter processing section 56d, 57d. In this manner, because MTF is greatly different in deterioration degree between the first imaging device 68 and the second imaging device 83, proper filter process is carried out. Also, because MTF deterioration becomes conspicuous as the frequency range is higher, the filter processing section 56d, 57d carries out an emphasis process on an high-frequency image signal thereby repairing "blur" and improving image quality.

For this reason, the filter processing sections 56d, 57d are different in filter process depending upon whether the input image signal is an image signal from the first imaging device 68 or an image signal from the second imaging device 83.

The density converting section 56e, 57e (density converting means, binarizing means) is to perform density conversion on an image signal filter-processed in the filter processing section 56d, 57d. For example, where an image signal is in facsimile communication, where print condition is designated binary, or so, the image signal is processed binary. Meanwhile, where the print condition is multi-valued as in picture images, density conversion is made on the basis of a predetermined density characteristic, thereby improving quality. The density converting section 56e, 57e has a RAM control section (not shown) and RAM or the like (not shown), to read as an input image signal address a data-converting look-up table set in the RAM thereby carrying out data conversion and density converting process. The image signal completed of density conversion process is stored to the image memory.

The above is the processing operation on an image signal obtained in the first imaging device 68 and second imaging device 83 by the image processing section 56, 57.

Next, explanations will be made on the operation, in the both-side reading mode, of the first scanning and reading system 6 and second scanning and reading system 8, the operation of the automatic document feeding device 9 and the operation of the first light source 61 and second light source 82, using FIG. 1 to FIG. 4.

As shown in FIG. 1, in a both-side reading mode, the first scanning unit 63 of the first scanning and reading system 6 moves to and stops at a position pos1 in FIG. 1. In the stop state, the document moving through the first moving document reading section 3 at a contact-glass-side surface (underside surface in the figure) is illuminated by the first light source 61, thus being read-scanned. Also, the second scanning and reading system 8 illuminates an upper surface in the figure of the document moving through the second moving document reading section 4 with the second light source 82 thereby carrying out read-scanning.

Figure 4:
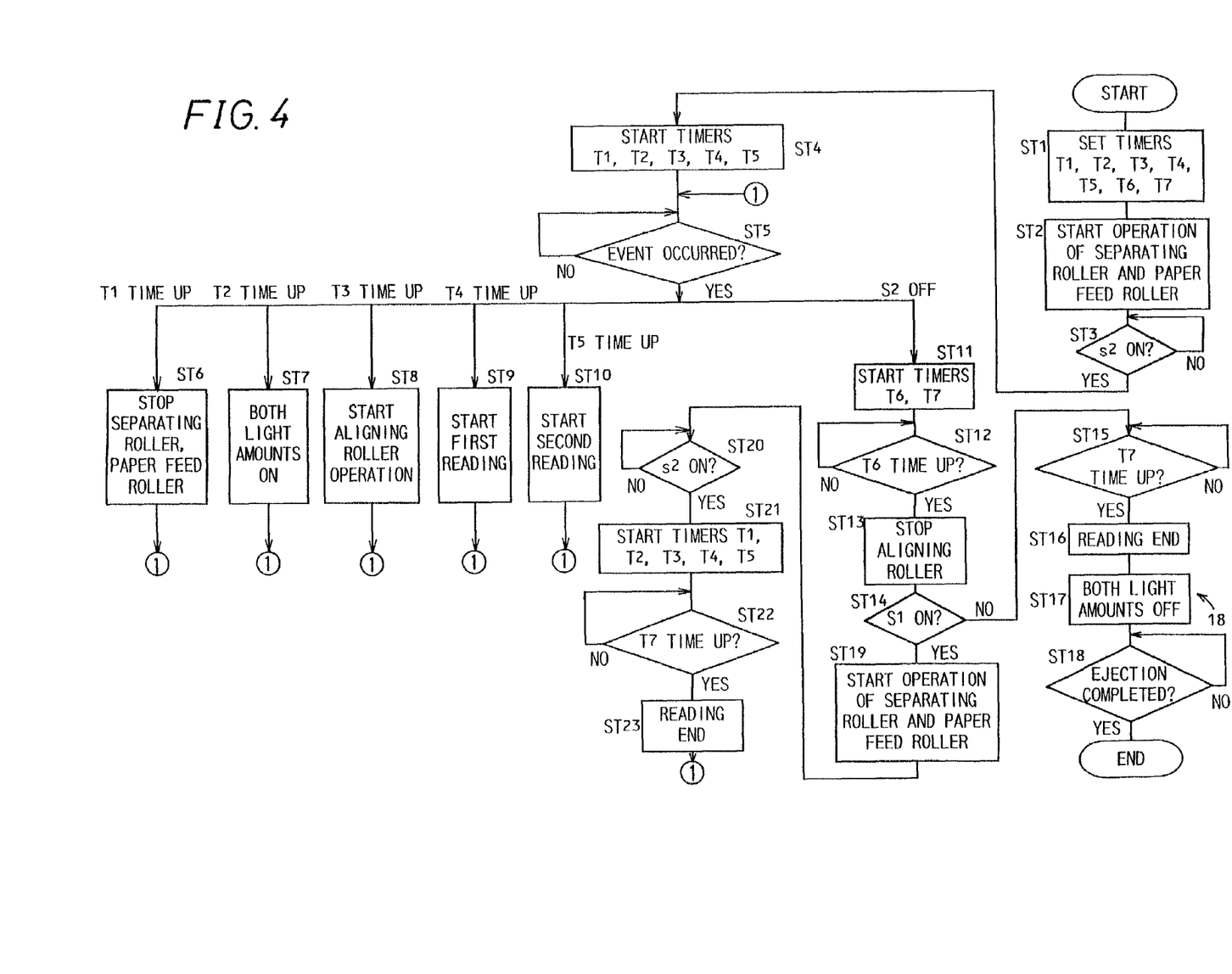
FIG. 4 is a flowchart showing a both-side document reading operation.

FIG. 4 is a flowchart of a both-side document reading process showing an embodiment of the invention. As shown in the figure, when a both-side document reading process is started, the timers T1–T7 are first set in step ST1 and thereafter the separation feed roller 92a and paper feed roller 91b start operation in step ST2 thus carrying out paper-feed operation. Then, the document detecting sensor s2 detects a document (YES determination in step ST3) and thereafter the timers T1–T5 start (step ST4). Herein, T1 is a time of from document detection (YES determination in step ST5) by the document detecting sensor s2 to a completion of alignment, wherein, when the timer T1 times up, the separation feed roller 92a and paper feed roller 91b are stopped to end the paper-feed operation, returning to (1) (step ST6). T2 is a time required from document detection by the document detecting sensor s2 to putting-on of both the light sources 61, 82. T3 is a time of from document detection by the document detecting sensor s2 to operation start of the aligning roller pair 93. The detail of them will be described later. T4, T5 is a time of from document-detection time point by the document detecting sensor s2 to reaching of the document to the first moving document reading section 3 or second moving document reading section 4, wherein, after reaching, first reading and second reading are started, returning to (1) (steps ST9, ST10).

Meanwhile, when the document at a rear end passes the document detecting sensor s2 to turn OFF the document detecting sensor s2, the timers T6, T7 start (step ST11). The timer T6 stops the aligning roller pair 93 after the passage in the time of from passing the document detecting sensor s2 by the document rear end to passing the aligning roller pair 93 (steps ST12, ST13). Also, T7 is a time of from passing the document detecting sensor s2 by the document rear end to passing the second moving document reading section 4, wherein reading is ended after the passage (steps ST14, ST15, ST16). Also, in the case that after time-up of T6 the document detecting sensor s1 turns on to confirm the existence of a next document, the paper feed operation of the next document is started. After the document detecting sensor s2 detects a document, the timers T1–T5 start (steps ST19–ST21). Thereafter, when T7 times up, reading is ended for return to (1) (steps ST22, ST23). Meanwhile, where the document detecting sensor s1 is not turned on and determination is made as an absence of a next document, after time-up of T7 the reading is ended and both the light sources 61, 82 are put OFF (step ST17). Completing document ejection, the both-side document reading process is ended (step ST18). Because of the operation like this, maintaining means 18 is configured in the steps ST15-ST17.

Figure 5:
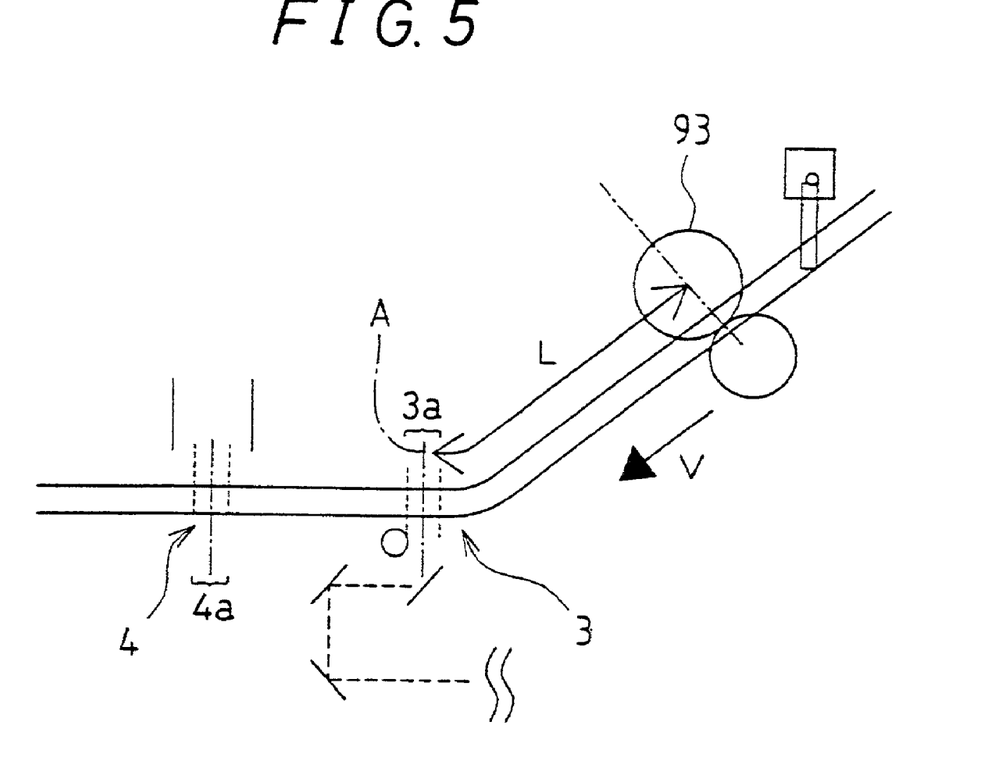
FIG. 5 is a view showing an outline of each moving-document reading section.
Figure 6:
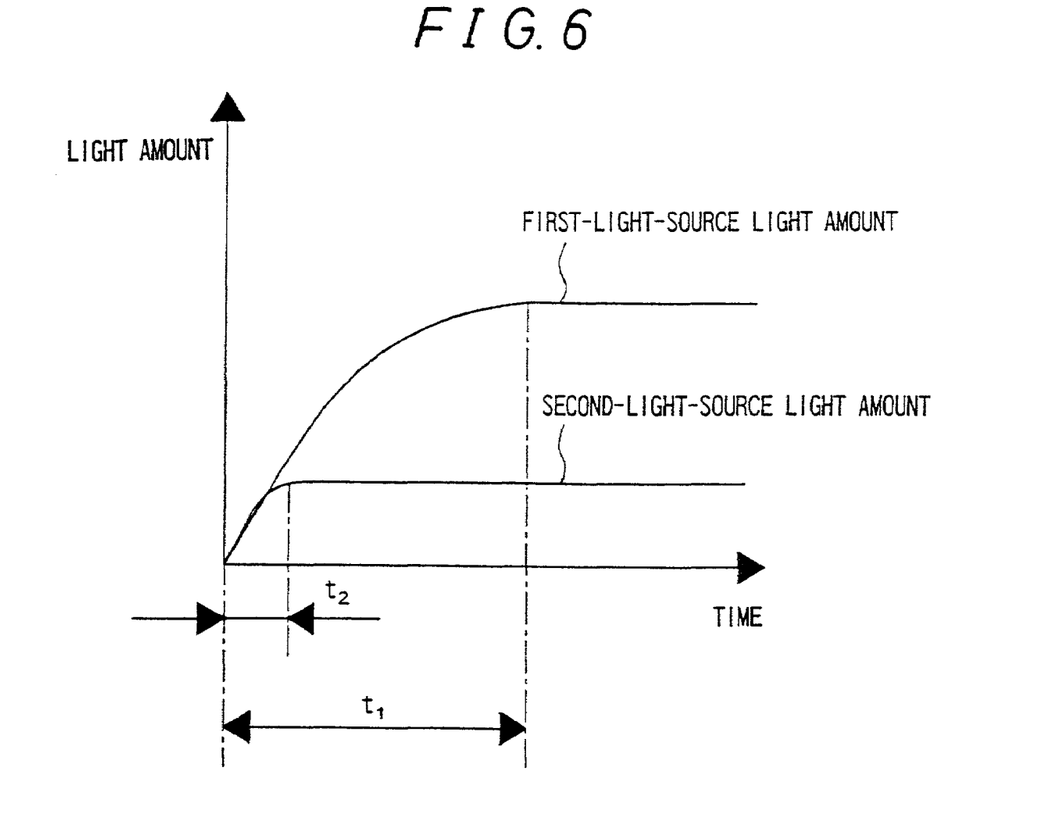
FIG. 6 is a diagram showing a light-amount change upon starting the lighting on each light source.

Next, explanation is made on the detail of the timing of putting on the light sources 61, 82, by using FIG. 5 and FIG. 6.

FIG. 5 is a schematic view of a part concerning document transport and moving-document reading, while FIG. 6 is a graph showing a relationship between a time and light amount after putting on of the first light source 61 and the second light source 82.

The scanner apparatus 1 has, as show in FIG. 2, lighting means 19 to calculate, depending upon a distance of from a document moving position to a first illuminating region 3a as a region for reading an image by the first scanning and reading system 6 and a document moving velocity, a time the document reaches the first illuminating region 3a, thereby setting a timing of putting on the first light source 61 on the basis of a result of the calculation.

Namely, provided that the document transport distance from the aligning roller pair 93 to a center A of the first moving document reading section 3 is L as shown in FIG. 5, the document transport speed is V and the time required for the first light source 61 to stabilize in light amount is t1 as shown in FIG. 6, the time of transporting the document from the aligning roller pair 93 to the first moving document reading section center A is given L/V. Herein, the lighting means 19 if t1<L/V puts on the first light source 61 after a lapse of time (L/V−t1) from starting-up of the aligning roller pair 93. Meanwhile, where t1>L/V, after the document reaches the aligning roller pair 93 the aligning roller pair 93 is started up after a lapse of time (t1−L/V) from starting-up of the first light source 61 thereby controlling various sections to transport the document.

At this time, because the second light source 82 is structured by an LED and the time for stabilizing the light amount is as short as t2 in the figure, the timing of putting on the second light source 82 is made as that of the first light source 61 slower in response. Otherwise, the second light source 82 may be put on in the duration the document reaches the center A of the first illuminating region 3a.

Incidentally, the timing of putting on the second light source 82 may be set similarly to the timing of putting on the first light source 61.

As explained above, in the present embodiment, the light sources 61, 82 of the both-side scanning and reading systems 6, 8 are maintained in a predetermined light amount before time-up of the timer T7 having a time of from passing the document detecting sensor s2 by a document rear end to passing the second illuminating region 4a. Namely, the amount of light illumination to each surface is maintained constant until the read operation at the document opposite surfaces is completely ended. This can avoid the reading density in the other scanning and reading system from changing due to a light amount change in one scanning and reading system while suppressing the back reflection due to displacing in a document transport direction the position of the scanning and reading systems 6, 8 arranged on the opposite sides of the document transport path. Thus, it is possible to obtain read data of density under constant reading conditions throughout reading the document.

Meanwhile, in the present embodiment, the timing of putting on both the light sources 61, 82 and the timing of document transport are calculated thereby shortening the time the light sources 61, 82 are on and hence improving energy characteristic.

Furthermore, in the present embodiment, where for example the apparatus is reduced in size, even the foregoing L if decreased can be coped with by changing the timing of document transport and the timing of putting on both the light sources 61, 82.

In the embodiment, explanation was made on the case the invention is applied as a scanner apparatus. The invention is not limited to this but can be applied for a both-side-document reading unit, such as a copier, a printer and a facsimile.

Also, in the embodiment, although the first moving document reading section 3 was arranged on the upstream side of the second moving document reading section 4 in a transport direction, conversely the second moving document reading section 4 may be arranged on the upstream side of the first moving document reading section 3 in the transport direction.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A both-side document reading apparatus for reading images of one side surface and another side surface of a document transported from a document tray and moving, by emitting light toward the one side surface of the document in moving state by a first light source and by emitting light toward the other side surface of the document in moving state by a second light source, comprising:
    a first reading portion, disposed in a region for reading the one side surface of the document and provided with the first light source, for reading an image of the one side surface of the document; and
    a second reading portion, disposed in a region for reading the other side surface of the document and provided with the second light source, for reading an image of the other side surface of the document,
    wherein the light source of one of the first reading portion and the second reading portion which is disposed on a downstream side in the document transport direction is driven into a lighting state, after the light source of the other of the first reading portion and the second reading portion which is disposed on an upstream side in the document transport direction is driven into a lighting state, and before the document image reading is started by the other of the first reading portion and the second reading portion which is disposed on the upstream side in the document transport direction, and
    wherein the first light source and the second light source are turned off after the completion of reading of the transported document by the one of the first-reading portion and the second reading portion which is disposed on the downstream side in the document transport direction.

2. The both-side document reading apparatus of claim 1, further comprising a document detecting sensor for detecting the transported document on the more upstream side in the document transport direction than the other of the first reading portion and the second reading portion which is disposed on the upstream side in the document transport direction,
    wherein after the document detecting sensor detects the document, the light source provided with the other of the first reading portion and the second reading portion which is disposed on the upstream side in the document transport direction is driven into a lighting state.

3. The both-side document reading apparatus of claim 1, wherein the first light source and the second light source are turned off, after the document reading by the one of the first reading portion and the second reading portion which is disposed on the downstream in the document transport direction has been completed, and the document has passed the region for reading the document by the one of the first reading portion and the second reading portion which is disposed on the downstream side in the document transport direction.

4. The both-side document reading apparatus of claim 1, wherein the first light source and the second light source are different light sources.

5. The both-side document reading apparatus of claim 4, wherein a light amount of the first light source is lamer than that of the second light source.

6. The both-side document reading apparatus of claim 4, wherein the second light source is composed of a light-emitting diode.

7. The both-side document reading apparatus of claim 1, wherein the other of the first reading portion and the second reading portion which is disposed on the upstream side in the document transport direction, performs reading process of an image of one side surface of a moving document and an image of one side surface of a stationary document placed.

8. An image forming apparatus comprising a both-side document reading apparatus for reading images of one side surface and another side surface of a document transported from a document tray and moving, by emitting light toward the one side surface of the document in moving state by a first light source and by emitting light toward the other side surface of the document in moving state by a second light source,
    the both-side document reading apparatus comprising:
    a first reading portion, disposed in a region for reading the one side surface of the document and provided with the first light source, for reading an image of the one side surface of the document; and
    a second reading portion, disposed in a region for reading the other side surface of the document and provided with the second light source, for reading an image of the other side surface of the document,
    wherein the light source of one of the first reading portion and the second reading portion which is disposed on a downstream side in the document transport direction is driven into a lighting state, after the light source of the other of the first reading portion and the second reading portion which is disposed on an upstream side in the document transport direction is driven into a lighting state, and before the document image reading is started by the other of the first reading portion and the second reading portion which is disposed on the upstream side in the document transport direction, and
    wherein the first light source and the second light source are turned off after the completion of reading of the transported document by the one of the first reading portion and the second reading portion which is disposed on the downstream side in the document transport direction.

9. A both-side document reading apparatus comprising:
    a first reading portion. provided with a first light source, for reading one side surface of a document by emitting light toward the one side surface of the document by the first light source; and a second reading portion, provided with a second tight source, for reading another side surface of the document by emitting light toward the other side surface of the document by the second light source, wherein the first and second reading portions are arranged so that a reading region of the one side surface by the first reading portion is arranged on an upstream side from a reading region of the other side surface by the second reading portion in a document transport direction, and wherein the first light source is turned off after the document has passed through the reading region of the second reading portion.

10. The both-side document reading apparatus of claim 9, wherein a time period over which a lighting state of the first light source is maintained is longer than a time period over which a lighting state of the second light source is maintained.

11. The both-side document reading apparatus of claim 9, wherein the second light source is turned on upon reaching or before reaching of the document to the reading region of the first reading portion.

12. The both-side document reading apparatus of claim 9, wherein the second light source is driven into a lighting state after the first light source is driven into a lighting state and before reading of the document by the first reading portion is started.

13. The both-side document reading apparatus of claim 12, wherein the second light source is composed of a light emitting diode.

14. The both-side document reading apparatus of claim 9, further comprising:
 a document transporting roller, disposed upstream from the first reading portion, for transporting the document to the first reading portion and the second reading portion;
 position detecting means for detecting leading and tail edges of the document which is transported to the reading region of the first reading portion by the document transporting roller; and
 maintaining means for maintaining a lighting state of the first light source in order to read an image by the first reading portion in cases where, before a predetermined time has elapsed after the detection of the tail edge of the document by the position detecting means, a leading edge of a subsequent document is detected.

15. The both-side document reading apparatus of claim 14, wherein the maintaining means makes the first light source off in cases where, before a predetermined time has elapsed after the detection of the tail edge of the document by the position detecting means, a leading edge of a subsequent document is not detected.

16. The both-side document reading apparatus of claim 14, wherein the maintaining means maintains the lighting state of the first light source until the second light source is turned off in cases where, before a predetermined time has elapsed after the detection of the tail edge of the document by the position detecting means, a leading edge of a subsequent document is not detected.

17. The both-side document reading apparatus of claim 9, wherein the first and second light sources are separately driven.

18. An image forming apparatus comprising a both-side document reading apparatus,
 the both-side document reading apparatus comprising:
 a first reading portion, provided with a first light source, for reading one side surface of a document by emitting light toward the one side surface of the document by the first light source; and
 a second reading portion, provided with a second light source, for reading another side surface of the document by emitting light toward the other side surface of the document by the second light source,
 wherein the first and second reading portions are arranged so that a reading region of the one side surface by the first reading portion is arranged on an upstream side from a reading region of the other side surface by the second reading portion in a document transport direction, and
 wherein the first light source is turned off after the document has passed through the reading region of the second reading portion.

* * * * *